US008531697B2

(12) United States Patent
Arita et al.

(10) Patent No.: US 8,531,697 B2
(45) Date of Patent: *Sep. 10, 2013

(54) IMAGE FORMING SYSTEM, GROUPWARE SERVER, IMAGE FORMING APPARATUS, IMAGE FORMING METHOD, AND IMAGE FORMING PROGRAM

(75) Inventors: Junko Arita, Tokyo (JP); Ryuuichi Kiyama, Kanagawa (JP); Takeshi Hasebe, Chiba (JP); Sanae Endoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 950 days.

This patent is subject to a terminal disclaimer.

(21) Appl. No.: 11/869,320

(22) Filed: Oct. 9, 2007

(65) Prior Publication Data
US 2008/0252934 A1 Oct. 16, 2008

(30) Foreign Application Priority Data

Oct. 18, 2006 (JP) ................................. 2006-284315

(51) Int. Cl.
*G06F 3/12* (2006.01)
(52) U.S. Cl.
USPC ........... 358/1.15; 358/1.1; 358/1.9; 358/1.13; 358/1.16; 358/403; 709/201; 709/203; 709/204; 709/205; 709/213; 707/740
(58) Field of Classification Search
None
See application file for complete search history.

(56) References Cited

U.S. PATENT DOCUMENTS

| 6,166,826 | A | * | 12/2000 | Yokoyama | ................... 358/1.16 |
| 6,941,305 | B2 | * | 9/2005 | Magouirk et al. | ..................... 1/1 |
| 2002/0044299 | A1 | * | 4/2002 | Iwase et al. | ................... 358/1.15 |
| 2003/0076531 | A1 | | 4/2003 | Kawasumi et al. | |
| 2003/0233437 | A1 | | 12/2003 | Kitada et al. | |
| 2004/0024811 | A1 | | 2/2004 | Kitada et al. | |
| 2004/0044958 | A1 | * | 3/2004 | Wolf et al. | ..................... 715/513 |
| 2004/0070613 | A1 | * | 4/2004 | Sprague et al. | ............... 345/762 |
| 2005/0198559 | A1 | * | 9/2005 | Fujiwara | ....................... 715/500 |

(Continued)

FOREIGN PATENT DOCUMENTS

| JP | 11-203314 | 7/1999 |
| JP | 2000-322425 | 11/2000 |

(Continued)

OTHER PUBLICATIONS

Ricoh Corporation, "Scanning Solution for Livelink", [Online] http://www.ricoh-usa.com/products/solutions/pdf/globalscan/Livelink.pdf>, XP 002454961, 2005, 2 Pages.*

(Continued)

*Primary Examiner* — Miya J Cato
(74) *Attorney, Agent, or Firm* — Oblon, Spivak, McClelland, Maier & Neustadt, L.L.P.

(57) ABSTRACT

An image forming system is disclosed that includes a groupware server and an image forming apparatus that functions as a groupware terminal. The groupware server includes a document database that stores document data and attribute information corresponding to the document data. The image forming apparatus includes a read unit that reads the document data and the attribute information corresponding to the document data stored in the document database, and a change unit that changes the attribute information read by the read unit into changed attribute information. In turn, the groupware server stores the read document data and the changed attribute information in the document database.

10 Claims, 14 Drawing Sheets

(56) References Cited

U.S. PATENT DOCUMENTS

2006/0059462 A1* 3/2006 Yamamoto .................. 717/115
2007/0076240 A1* 4/2007 Ogura ........................ 358/1.14
2007/0146791 A1* 6/2007 Murase ...................... 358/1.16

FOREIGN PATENT DOCUMENTS

| JP | 2005-208977 | 8/2005 |
|----|-------------|---------|
| JP | 2005-316952 | 11/2005 |
| JP | 2005-352782 | 12/2005 |

OTHER PUBLICATIONS

Ricoh Corporation, "Scanning Solution for Livelink", [Online] http://www.ricoh-usa.com/products/solutions/pdf/globalscan/Livelink.pdf>, XP 002454961,2005, 2 Pages.*

U.S. Appl. No. 11/742,795, filed May 1, 2007, Arita, et al.

Ricoh Corporation: "Scanning Solution for Livelink", [Online] 2005, Retrieved from the Internet URL: http://www.ricoh-usa.com/products/solutions/pdf/globalscan/Livelink.pdf [retrieved on Oct. 15, 2007], XP002454962, pp. 1-2.

Ricoh Corporation: "Scanning Solution for FileNet", [Online] 2005, Retrieved from the Internet URL: http://www.ricoh-usa.com/products/solutions/pdf/globalscan/Filenet.pdf [retrieved on Oct. 15, 2007], XP002454961, pp. 1-4.

Anonymous: "Ricoh Corp and Open Text Align to Integrate GlobalScan Into Livelink's Content Management System", Business Wire, Retrieved from the Internet URL: http://testing2.outputlinks.com/html/news/Ricoh_Open_Text_Integrate_Solutions_110503133000-1370231122.aspx [retrieved on Jul. 16, 2010], XP002592279, Nov. 3, 2003, 1 page.

Office Action issued Mar. 29, 2011 in Japanese Patent Application No. 2006-134158.

Office Action issued Jun. 21, 2011, in Japanese Patent Application No. 2006-284315.

Office Action issued Jun. 28, 2011, in Japanese Patent Application No. 2006-134158.

* cited by examiner

FIG.12

MANUAL DOCUMENT DB ● EXISTING DOCUMENT

DOCUMENT INFORMATION INPUT ~306

| | |
|---|---|
| FILE NAME | SPECIFICATION_%MM/DD/YY%-%HH:MM:SS% |
| DOCUMENT NAME | TECHNICAL EDUCATION |
| DOCUMENT TYPE 1 | 1. PRODUCT QUALITY DOCUMENT |
| DOCUMENT TYPE 2 | 01. FUNCTION |
| DOCUMENT TYPE 3 | 01-1. FUNCTION CHART |
| TRANSMISSION DESTINATION | MR./ MRS./ MS. ○○ |
| EXAMINER 1 | MR./ MRS./ MS. ××  |
| EXAMINER 2 | MR./ MRS./ MS. △△ |
| EXAMINER 3 | |
| SEARCH KEYWORD | SPECIFICATION |

IMAGE FORMING SYSTEM, GROUPWARE SERVER, IMAGE FORMING APPARATUS, IMAGE FORMING METHOD, AND IMAGE FORMING PROGRAM

BACKGROUND OF THE INVENTION

1. Field of the Invention

The present invention relates to an image forming system, a groupware server, an image forming apparatus, an image forming method, and an image forming program that use groupware.

2. Description of the Related Art

It is noted that techniques for converting paper documents into electronic document data are developing in various fields of business enterprises. According to conventional groupware techniques, in the case of converting a paper document into electronic document data and storing the electronic document data in a groupware server, a user scans the paper document using an imaging apparatus having a scanning function such as a scanner to convert the paper document into electronic document data. Then, the user stores the electronic document data in his/her computer or a file server, for example, to perform preparatory processes on the electronically converted document data such as renaming the document data. Then, the user stores such prepared document data in a predetermined area of a groupware server.

Also, in the case of editing the document data stored in the groupware server by adding new document data to the document data stored in the groupware server, for example, the paper document to be added is scanned and preparatory processes are performed on the scanned data to prepare document data to be added. Then, the prepared document data are stored in a predetermined area of the groupware server at which the document data subject to editing (adding) are stored.

However, according to such conventional techniques, procedures for converting a paper document into electronic data is relatively complicated and burdensome so that techniques for enabling swift conversion of a paper document into electronic data and/or editing of the electronic document data are in demand.

SUMMARY OF THE INVENTION

Aspects of the present invention are directed to providing an image forming system, a groupware server, an image forming apparatus, an image forming method, and an image forming program that are adapted to simplify the procedures for converting a paper document into electronic data and facilitate editing of electronic document data.

According to one aspect of the present invention, an image forming system including a groupware server and an image forming apparatus that functions as a groupware terminal is provided, wherein the groupware server includes a document database that stores document data and attribute information corresponding to the document data;

the image forming apparatus includes a read unit that reads the document data and the attribute information corresponding to the document data stored in the document database, and a change unit that changes the attribute information read by the read unit into changed attribute information; and the groupware server stores the read document data and the changed attribute information in the document database.

According to another aspect of the present invention, a groupware server that is connected to an image forming apparatus that functions as a groupware terminal is provided, the groupware server including:

a communications unit that establishes communication with the image forming apparatus;

a document database that stores document data and attribute information corresponding to the document data;

a write unit that writes the document data and the attribute information corresponding to the document data on the document database; wherein when the communications unit receives an acquisition request for the attribute information corresponding to the document data from the image forming apparatus, the communications unit transmits the attribute information corresponding to the document data to the image forming apparatus; and when the communications unit receives a write request from the image forming apparatus to write changed attribute information that is changed from the attribute information corresponding to the document data, the write unit rewrites the changed attribute information on the document database.

According to another aspect of the present invention, an image forming apparatus that functions as a groupware terminal and is connected to a groupware server including a document database that stores document data and attribute information corresponding to the document data is provided, the image forming apparatus including:

a read unit that reads the document data and the attribute information corresponding to the document data from the groupware server;

a change unit that changes the attribute information read by the read unit into changed attribute information; and a transmission unit that transmits the read document data and the changed attribute information to the groupware server.

According to another aspect of the present invention, an image forming method is provided that is to be performed at an image forming apparatus that functions as a groupware terminal and is connected to a groupware server including a document database that stores document data and attribute information corresponding to the document data, the image forming method including the steps of:

reading the document data and the attribute information corresponding to the document data from the groupware server;

changing the read attribute information into changed attribute information; and transmitting the read document data and the changed attribute information to the groupware server.

BRIEF DESCRIPTION OF THE DRAWINGS

FIG. 12 is a diagram showing an exemplary display screen of the operations panel displaying document information acquired by the image forming apparatus;

DESCRIPTION OF THE PREFERRED EMBODIMENTS

According to an aspect of the present invention, an image forming apparatus having a scanning function may be arranged to function as a groupware terminal so that document data of a paper document scanned by such an image forming apparatus may be directly stored in a groupware server. According to another aspect of the present invention, document data stored in the groupware server may be read at the image forming apparatus and the read document data may be directly edited at the image forming apparatus. In this way, processes for converting a paper document into electronic data may be simplified, for example.

In the following, preferred embodiments of the present invention are described with reference to the accompanying drawings.

Figure 1:
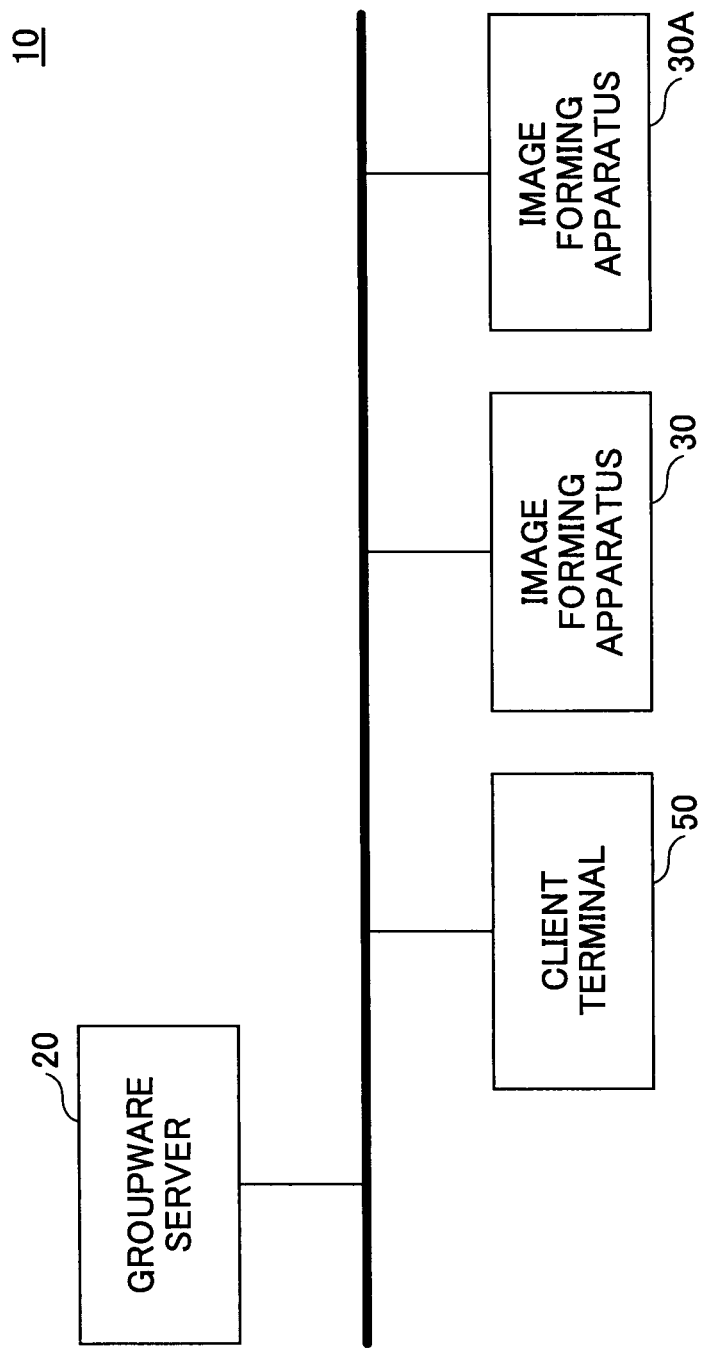
FIG. 1 is a block diagram showing a configuration of an image forming system according to an embodiment of the present invention.

FIG. 1 is a diagram showing an image forming system 10 according to an embodiment of the present invention. The illustrated image forming system 10 includes a groupware server 20, an image forming apparatus 30 that functions as a groupware client, an image forming apparatus 30A that accesses the groupware server 20 using a browser function, and a groupware client terminal 50. The above component elements of the image forming system 10 may be interconnected by a network such as a LAN (local area network).

The groupware server 20 may be a computer (referred to as PC hereinafter) including a computational processing device such as a CPU and a storage device such as a memory that has server groupware software installed therein.

The image forming apparatus 30 includes a client groupware module and functions as a groupware client terminal. The image forming apparatus 30A has a browser function for accessing the groupware server 20. The client terminal 50 may be a general purpose PC including a computational processing device and a storage device that has client groupware software installed therein. The client terminal 50 may perform various functions supported by the groupware by directing the image forming apparatuses 30 and/or 30A to perform printing operations, or accessing the groupware server 20, for example.

Figure 2:
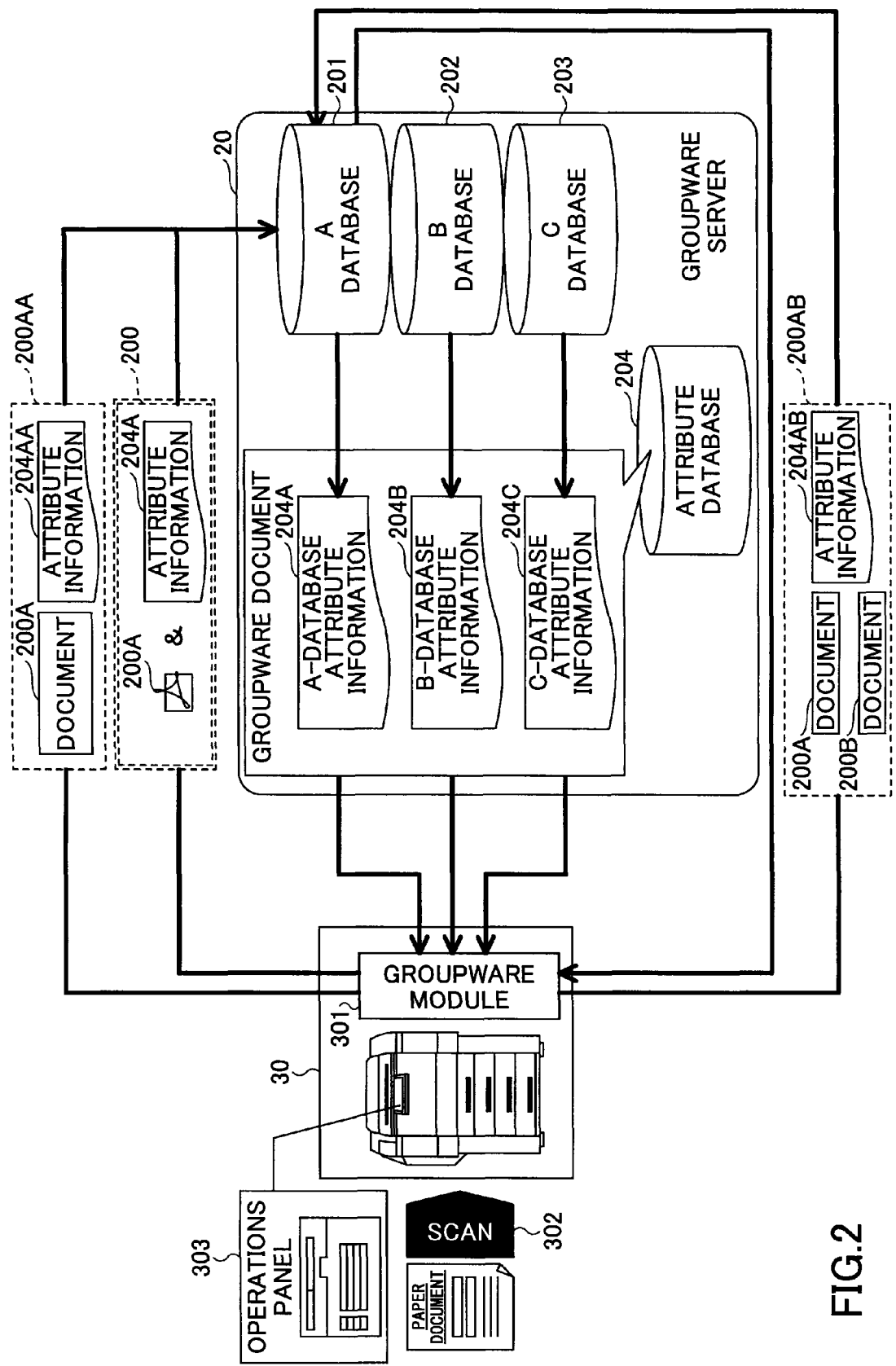
FIG. 2 is a diagram illustrating processes performed between a groupware server and an image forming apparatus.

According to an embodiment of the present invention processes illustrated by FIG. 2 are performed between the groupware server 20 and the image forming apparatus 30.

A first set of process operations involves scanning a paper document to convert the paper document into electronic document data at the image forming apparatus 30, attaching corresponding attribute information to the electronic document data, and directly storing the electronic document data and the corresponding attribute information from the image forming apparatus 30 to the groupware server 20.

A second set of process operations involves reading and document data and corresponding attribute information stored in the groupware server 20 at the image forming apparatus 30, editing the read document data and/or corresponding attribute information, and rewriting the edited document data and/or corresponding attribute information to the groupware server 20. It is noted that Lotus Notes/Domino (registered trademark) is preferably used in the embodiments described below; however, the present invention is not limited to use of such groupware and other types of groupware having similar functions may be used as well.

FIG. 2 is a diagram illustrating the processes performed between the groupware server 20 and the image forming apparatus 30 according to the present embodiment. In FIG. 2, the groupware server 20 includes A-database 201, B-database 202, C-database 203, and attribute database 204.

A-database 201 is configured to store document data and corresponding attribute information therein. The attribute information may include information related to a format unique to the A-database, the file name of the document data, and the storage address of the document data, for example. By attaching such attribute information to the document data, the document data having the attribute information attached thereto may be stored in the groupware server 20 and identified as shared data. In the following descriptions, such shared data that are stored in the groupware server 20 are referred to as groupware document data. It is noted that information items included in the attribute information are described below. The B-database 202 and the C-database 203 are also configured to store groupware document data including document data and their corresponding attribute information in a manner similar to A-database 201.

The attribute database 204 is configured to store attribute information stored in the A-database 201, B-database 202, and C-database 203. Specifically, the attribute information stored in the above-databases may be pre-registered in the attribute database 204 by an administrator of the image forming system so that attribute information 204A of the A-database 201, attribute information 204B of the B-database 202, and attribute information 204C of the C-database 203 may be stored in the attribute database 204, for example.

The image forming apparatus 30 includes a groupware module 301 for enabling the image forming apparatus 30 to function as a groupware terminal, a scan unit 302 for scanning a paper document, and an operations panel 303 for performing process operations of the image forming apparatus 30. The operations panel 303 may be a touch panel or a software keyboard displayed on a display unit, for example.

The image forming apparatus 30 scans a paper document and converts the paper document into electronic document data using the scan unit 302 and attaches corresponding attribute information to the electronically-converted document data to produce groupware document data.

In the following, the first set of process operations performed between the groupware server 20 and the image forming apparatus 30 are described using an example in which document data scanned by the scan unit 302 are stored in the A-database 201.

When selection is made by a user to have the image forming apparatus 30 function as a groupware terminal, the groupware module 301 is activated so that the image forming apparatus 30 may perform functions of a groupware terminal. In this way, the image forming apparatus 30 may be perceived as a groupware client that is capable of sharing data with the groupware server 20.

It is noted that certain processing operations are performed on the document data scanned by the scan unit 302 in order to convert the document data into a file with a predetermined extension. In the example described below, it is assumed that 'pdf' is used as the predetermined extension, and the document data are converted into a PDF file.

In the image forming apparatus 30, attribute information 204A that is unique to the A-database 201 is attached to PDF-file-converted document data 200A that are to be stored in the A-database 201. In the following, the process of attaching the attribute information is described.

The image forming apparatus 30 accesses the attribute database 204 to acquire an attribute information list containing attribute information for each of the databases that is stored in the attribute database 204. The acquired attribute information list may then be displayed on the operations panel 303 of the image forming apparatus 30. In turn, the user may select attribute information 204A of the A-database 201 in response to which the image forming apparatus 30 acquires the attribute information 204A from the attribute database 204. After acquiring the attribute information 204A, the image forming apparatus 30 refers to design information related to the A-database 201 that is included in the attribute information 204A and controls the operations panel 303 to display information items according to a format unique to the attribute information 204A, for example.

When the information items are displayed on the operations panel 303 of the image forming apparatus 30, the user may set information for each of the information items using the operations panel 303. After information is set for each of the information items of the attribute information 204A at the image forming apparatus 30, the set attribute information 204A is attached to the document data 200A to form groupware document data 200 to be stored in the A-database 201 of the groupware server 20.

As can be appreciated from the above descriptions, according to an embodiment of the present invention, the image forming apparatus 30 may be connected to a database of the groupware server 20 so that document data acquired by the image forming apparatus 30 may be directly stored from the image forming apparatus 30 to the database of the groupware server 20. In the case where plural databases are provided in the groupware server 20, the user may arbitrarily select a database to which the image forming apparatus 30 is to be connected so that document data may be directly stored in the selected database.

Also, according to another embodiment, attribute information unique to a database may be pre-registered in the attribute database 204, and the attribute information registered in the attribute database may be displayed on the operations panel 303 so that the user may operate the operations panel 303 as though he/she is directly accessing the database of the groupware server 20 storing this attribute information. Also, with such a configuration, the design of an existing database may not have to be changed and the image forming apparatus 30 may be connected to a database of the groupware server 20 by merely registering attribute information of the database in the attribute database. In this way, exiting database resources of a user may be effectively utilized.

In the following, the second set of process operations performed between the groupware server 20 and the image forming apparatus 30 are described using an example in which groupware document data 200 stored in the A-database 201 are read and edited by the image forming apparatus 30.

The image forming apparatus 30 may read groupware document data stored in the groupware server 20 when it is functioning as a groupware terminal.

When an instruction is issued from the operations panel 303 directing the image forming apparatus 30 to read groupware document data 200 stored in the A-database 201, the image forming apparatus 30 reads the groupware document data 200 from the groupware server 20. Then, the image forming apparatus 30 directs the operations panel 303 to display the attribute information 204A of the groupware document data 200.

Specifically, information items of the attribute information 204A having initial information set thereto are displayed on the operations panel 303. The information set to the information items of the attribute information 204A may be changed at the image forming apparatus 30 using a software keyboard that is displayed on the operations panel 303 along with the attribute information 204A, for example. In this case, the software keyboard displayed on the operations panel 303 along with the attribute information 204A corresponds to a change unit for changing attribute information.

The attribute information 204A is changed to attribute information 204AA by the change unit, and the changed attribute information 204AA is reattached to the document data 200A. In this way, the groupware document data 200 are changed to groupware document 200AA, and the changed groupware document 200AA are rewritten on an area of the groupware server 20 at which the groupware document data 200 are stored. In other words, the groupware document data 200 are rewritten as the groupware document data 200AA in the A-database 201.

As can be appreciated from the above descriptions, according to an embodiment of the present invention, attribute information of groupware document data that are stored in the groupware server 20 may be directly changed and edited at the image forming apparatus 30.

Also, according to another embodiment, the image forming apparatus 30 may add newly scanned document data to the groupware document data 200 read from the groupware server 20. In the following, an example is described in which attribute information 204A of the groupware document data 200 is changed, and new document data 200B are added to the document data 200.

In the case of adding new document data, the image forming apparatus 30 reads the groupware document data to which the document data 200B are to be added. Specifically, in the present example, groupware document data 200 are read from the groupware server 20.

Then, the image forming apparatus 30 uses the scan unit 302 to scan a paper document and converts the paper document into document data 200B. Then, the image forming apparatus 30 adds the document data 200B to the groupware document data 200. Also, the attribute information 204A of the groupware document data 200 may have its information items changed as is necessary in accordance with the addition of the document data 200B. In this way, new document data 200B may be added to the groupware document data 200. In this case, the attribute information 204A is changed to attribute information 204AB, and the groupware document data 200 are changed to groupware document 200AB.

The groupware document data 200AB are rewritten on an are of the groupware server 20 at which the groupware document data 200 have previously been stored. In other words, the groupware document data 200AB are stored in the A-database 201.

As can be appreciated from the above descriptions, according to an embodiment of the present invention, document data that are newly scanned by the image forming apparatus 30 may be directly added to the groupware document data that are stored in the groupware server 20 at the image forming apparatus 30 to thereby facilitate editing of electronic document data.

In the following, processes according to embodiments of the present invention are described in greater detail.

Figure 3:
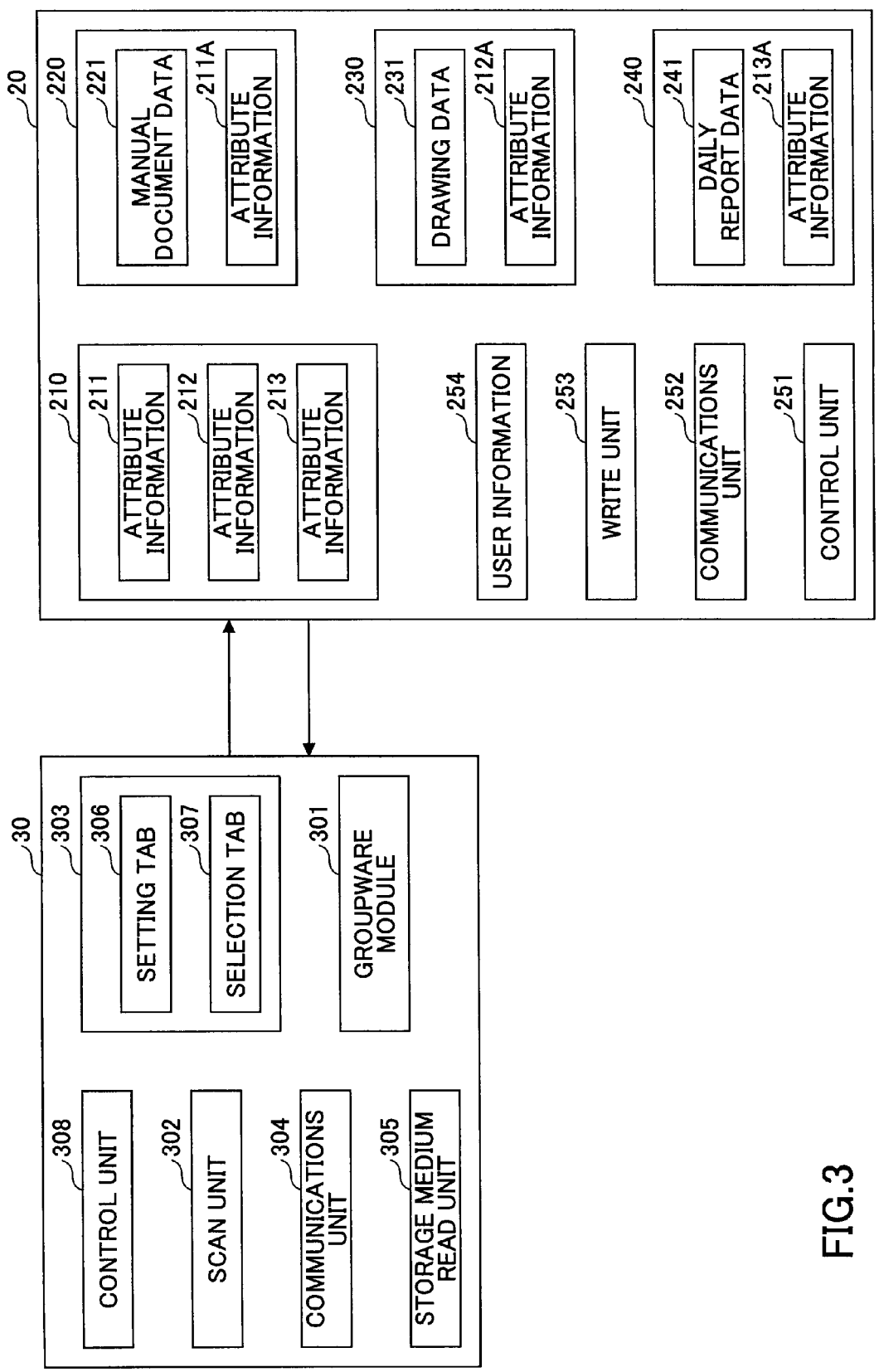
FIG. 3 is a block diagram showing functions configurations of the groupware server and the image forming apparatus.

FIG. 3 is a block diagram showing functional configurations of the groupware server 20 and the image forming apparatus according to an embodiment of the present invention.

In FIG. 3, the groupware server 20 includes an attribute database 210, a manual document database 220, a drawing database 230, a daily report database 240, a control unit 251, a communications unit 252, a write unit 253, and a user information database 254.

The attribute database 210 may have initial setting information that is pre-registered by a system administrator, for example, such information including attribute information 211 unique to the manual document database 220, attribute information 212 unique to the drawing database 230, and attribute information 213 unique to the daily report database 240.

The manual document database 220 may store document data used for creating manuals of products developed by a company, for example. The manual document database 220 may include manual document data 221 and attribute information 211A corresponding to the manual document data 221. The drawing database 230 may store design drawings of products developed by a company, for example. The drawing database 230 may include drawing data 231 and attribute information 212A corresponding to the drawing data 231. The daily report database 240 may store daily reports that are created on a daily basis within a company, for example. The daily report database 240 may include daily report data 241 and attribute information 213A corresponding to the daily report data 241.

In the following, the attribute information is described. The attribute information corresponds to data that are to be attached to document data obtained by scanning a paper document. By attaching corresponding attribute information to the scanned document data, the document data may be converted to groupware document data that may be stored in a corresponding database of the groupware server 20.

The attribute information may include groupware environment information, document information pertaining to the document data to be stored in the corresponding database, and setting information for the corresponding document database that is to store the document data, for example. The document information may be set according to a format unique to each database stored in the groupware server 20. Each time document data to be stored as groupware document data are acquired by the image forming apparatus 30 through scanning, corresponding document information is set to the acquired document data.

For example, document information of the manual document database 220 may include information items necessary for managing manual documents. Such information items may include the name of document data, a file name of the document data when the document data are to be stored as a groupware document data file having attribute information, the type of the document data indicating whether the document data correspond to confidential information, for example, the creator name of the document data, the creation time/date of the document data, page information indicating the arrangement of the document data, and search key(s) to be used for searching the document data, for example. The document information of the manual document database 220 may have information according to a predetermined format set to each of the above-described information items, for example.

Document information of the drawing database 230 may include information items such as the drawing serial number, the creator name, and the type of drawing indicating whether the drawing is a color drawing or a monochrome drawing, for example. Document information of the daily report database may include information items such as the creator name, the department to which the creator belongs, and the creation time/date of the daily report, for example.

Setting information may include predetermined format information pertaining to the predetermined format in which information is to be set to each of the above-described information items of the document information, address information of the databases required for enabling the image forming apparatus 30 to access the databases, and the names of the databases, for example. Upon storing document data in a database to which it is connected, the image forming apparatus 30 refers to setting information of the database corresponding to it connection destination and accesses this connection destination database to store document data therein.

In the following, the predetermined format information is described in greater detail. For example, with respect to the manual document database 210, the predetermined format information may including information indicating that the file name of the document data (information item) is to be described by alphabets (predetermined format), the creation time/date of the document data (information item) is to be described by an eight-digit number (predetermined format), and the creator name of the document data (information item) is to be described in kana characters (predetermined format). In the case where a user is to set the document information via the image forming apparatus 30, the user has to input information according to this predetermined format information, for example.

In registering the attribute information 211, 212, and 213 in the attribute database 210, the system administrator may select the information items of document information that are to be displayed at the image forming apparatus 30 to be set by the user. In this case, the attribute database 210 may be able to automatically acquire format information for the selected information items from the design information of the databases. It is noted that format information may include the above-described predetermined format information as well as the input method for inputting the document information, initial setting values of the information items, selection options, and the data type, for example.

As can be appreciated from the above descriptions, according to an embodiment of the present invention, in registering attribute information to the attribute database 210, the attribute database 210 may automatically acquire information related to the attribute information from design information of the databases so that attribute information registration operations to be performed by the system administrator may be simplified.

The control unit 251 controls the process operations executed at the groupware server 20. The communications unit 252 is used for enabling the groupware server 20 to establish communication with the image forming apparatus 30 or some other groupware terminal. The write unit 253 is used for writing document data transmitted from the image forming apparatus 30 onto the above-described databases. The user information database 254 stores user information for enabling a user to log into the image forming system 10.

The image forming apparatus 30 includes a communications unit 304, a storage medium read unit 305, and a control unit 308 in addition to the above-described groupware module 301, the scan unit 302, and the operations panel 303. The communications unit 304 is used for enabling the image forming apparatus 30 to establish communication with the groupware server 20 or some other groupware terminal. The storage medium read unit 305 may be a USB (Universal Serial Board) drive or some other drive means used for reading information from a USB memory or some other storage means. For example, the storage medium read unit 305 may be used to read user information stored in a USB memory. The control unit 308 controls process operations performed at the image forming apparatus 30.

The operations panel 303 includes a setting tab 306 that displays an input screen for setting attribute information and a selection tab 307 that displays a selection screen for selecting attribute information to be referenced from a list of attribute information associated with different databases that is stored in the attribute database 204. The operations of the operations panel 303 are described in detail below with reference to the relevant drawings.

Figure 4:
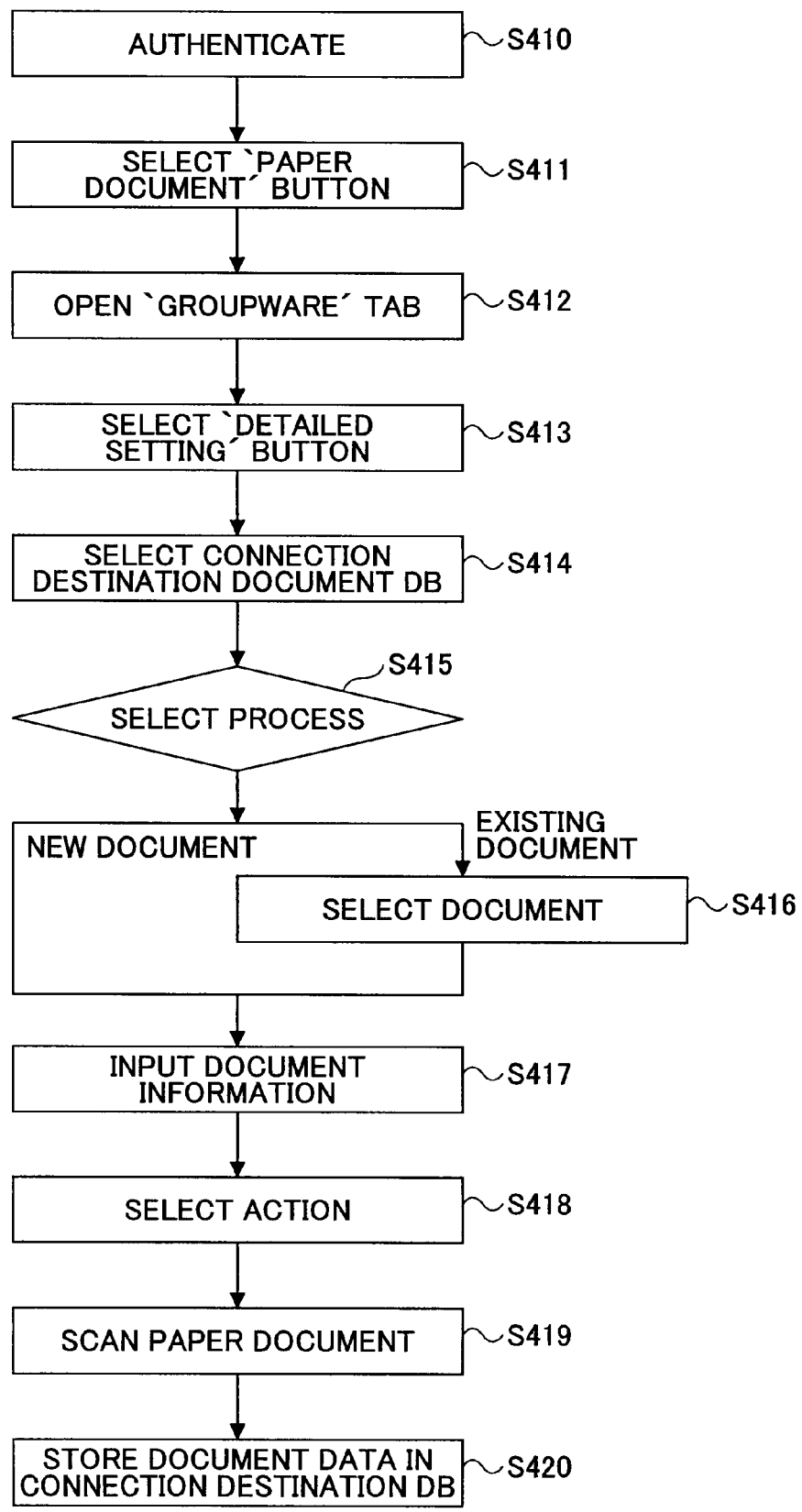
FIG. 4 is a flowchart illustrating process steps performed within the image forming system according to the present embodiment.

FIG. 4 is a flowchart illustrating process operations of the image forming system 10 according to an embodiment of the present invention. FIGS. 5-11 are diagrams illustrating display screens of the operations panel 303.

To use the groupware function of the image forming apparatus 30, the user has to log into a personal menu function of the image forming apparatus 30 and then log into the groupware function. It is noted that a personal menu function refers to a function that may only be used by a user whose user ID and password are registered in the image forming apparatus 30 beforehand. For example, functions that may be executed as a personal menu function may include accessing or viewing image data and/or electronic documents stored for each individual user within the image forming apparatus 30, using an address book stored for each individual user, or viewing mail documents of each individual user, for example.

According to the present embodiment, user information for logging into groupware may be used to log into the personal menu function of the image forming apparatus 30. In the following, process operations for authenticating the user are described.

When a storage medium such as a USB memory storing user information including user ID and password information for enabling a user to log into the groupware function is inserted into the storage medium read unit 305, the control unit 308 reads the information stored in the storage medium to acquire the user ID and password information. It is noted that the storage medium may store information such as groupware license information, authentication expiry information, and encryption key information in addition to the user ID and password information, for example.

The image forming apparatus 30 may display a software keyboard or some other input means on the operations panel 303 to enable a user to input his/her password. When a password is input by the user via the operations panel 303, the control unit 308 determines whether the password acquired from the storage medium matches the password input by the user. If the password acquired from the storage medium matches the password input by the user, the control unit 308 authenticates this user (step S410).

In the above-described user authentication process, if the password acquired from the storage medium does not match the password input by the user, the control unit 308 does not authenticate the user and may display user authentication process error information on the operations panel 303, for example. Also, in one embodiment, after acquiring the user ID and password information from the storage medium, the image forming apparatus 30 may store the acquired user ID and password information in its memory so that it may use the user ID and password information stored in its memory upon subsequently performing the user authentication process.

Figure 5:
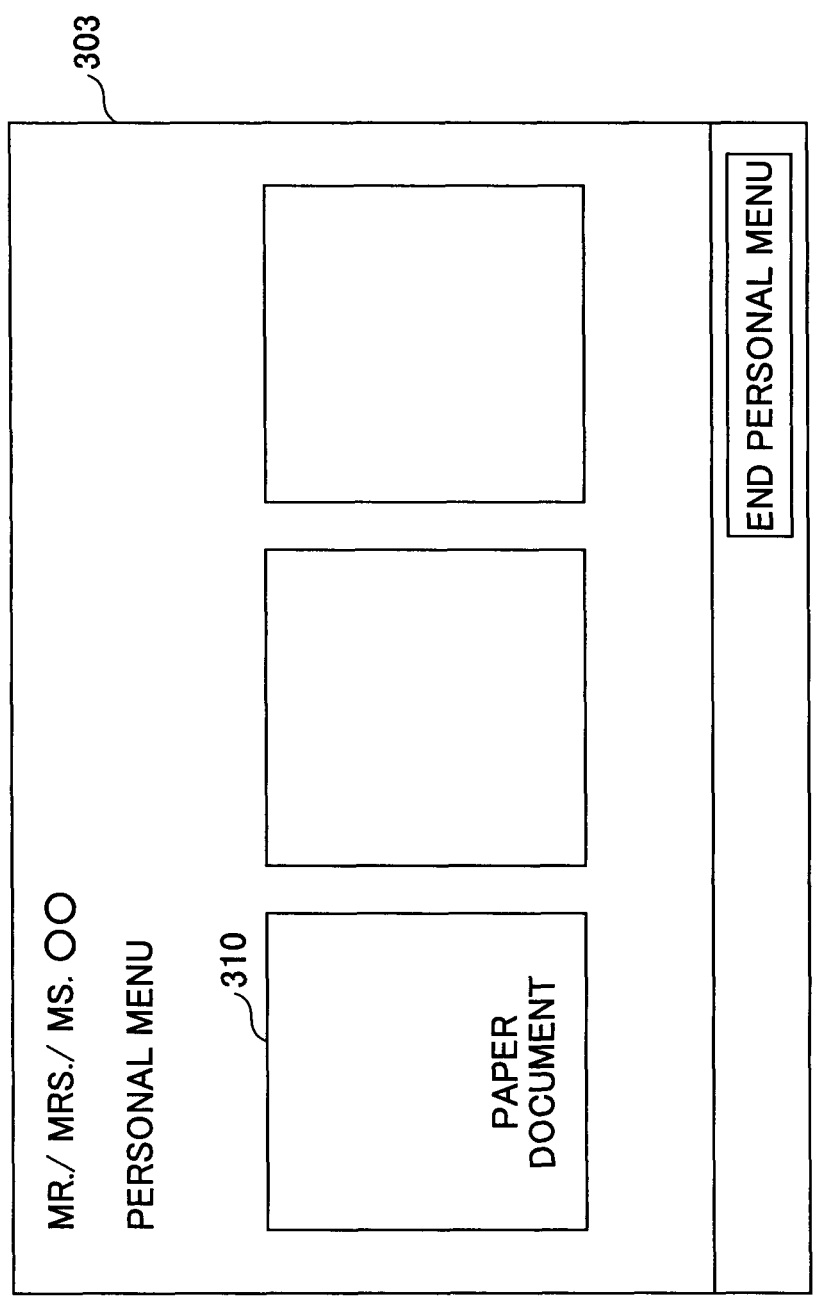
FIG. 5 is a diagram showing an exemplary display screen of an operations panel of the image forming apparatus to be displayed after logging into a personal menu function.
Figure 6:
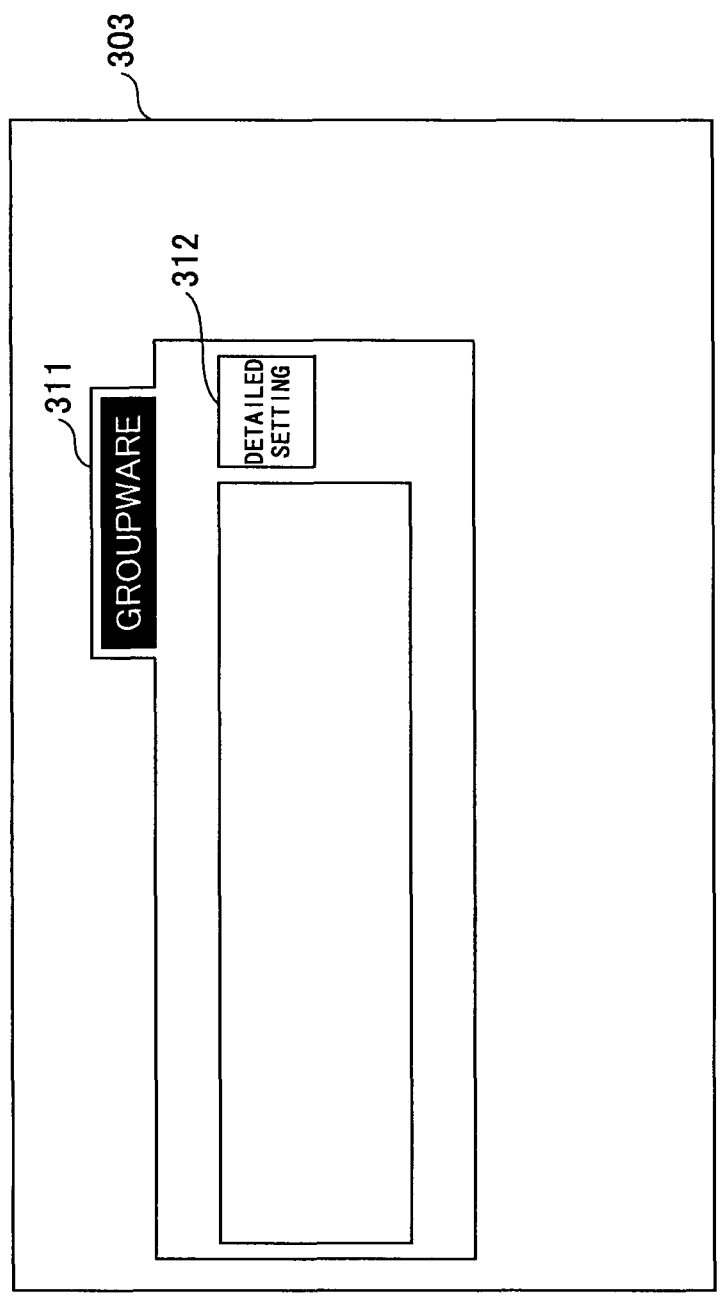
FIG. 6 is a diagram showing an exemplary display screen of the operations panel displaying a groupware function tab.

When the user is authenticated in step S410, the image forming apparatus 30 assumes that the user has logged into the groupware and the personal menu function, and displays an operations screen that is to be displayed after logging into the personal menu function. FIG. 5 is a diagram showing an example of such a display screen to be displayed after logging into the personal menu function being displayed by the operations panel 303. In this example, when a 'paper document' button 310 corresponding to a scanning function button is pressed by the user (step S411), the control unit 308 of the image forming apparatus 308 controls the operations panel 303 to display a groupware function tab 311 for activating the groupware module 301 (step S412). FIG. 6 is a diagram showing an exemplary display screen of the operations panel 303 displaying the groupware function tab 311.

When the groupware function tab 311 is selected, the groupware module 301 is activated so that the image forming apparatus may function as a groupware terminal. It is noted that functions of the groupware terminal include directly storing document data in a database of the groupware server 20, searching the databases of the groupware server 20, transmitting predetermined document data stored in a database as a file to a designated transmission destination, and transmitting and receiving mail, for example. In the present example, when the user presses a 'detailed setting' button 312 as is shown in FIG. 6 (step S413), the image forming apparatus 30 regards such action as an attribute information acquisition request and transmits a corresponding request signal to the groupware server 20.

Figure 7:
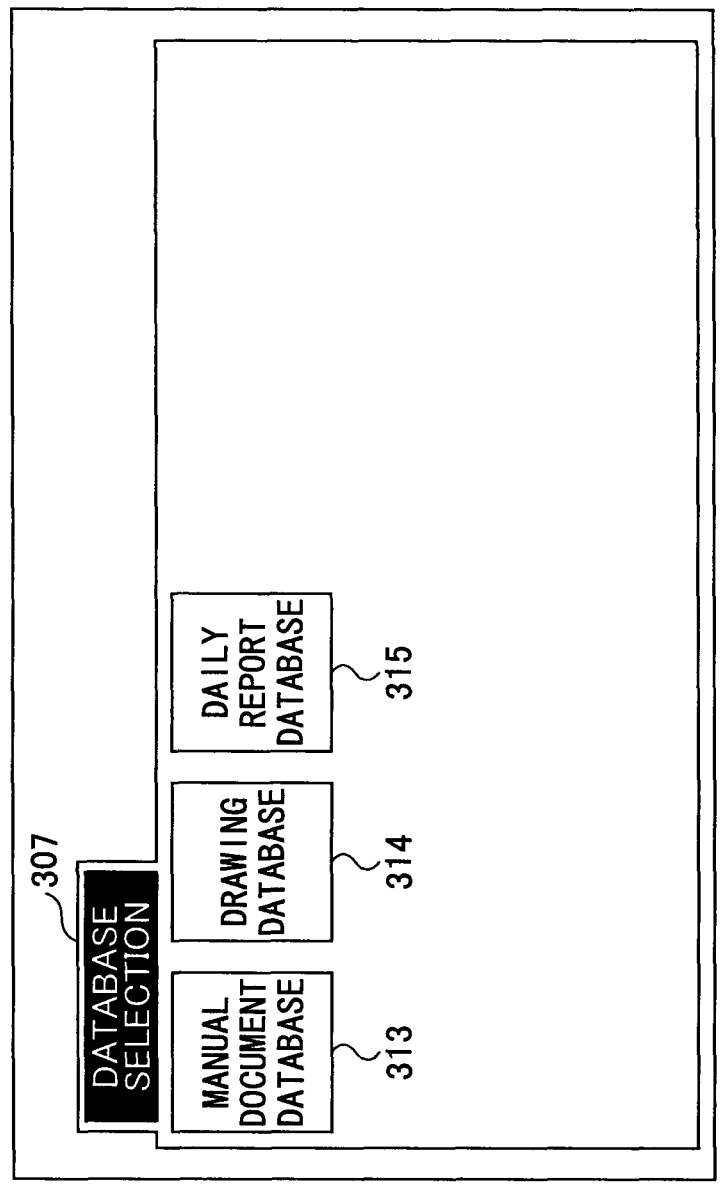
FIG. 7 is a diagram showing an exemplary display screen of the operations panel displaying an attribute information list.

When the groupware server 20 receives the attribute information acquisition request signal from the image forming apparatus 30, the control unit 251 of the groupware server 20 transmits the list of attribute information stored in the attribute database 210 to the image forming apparatus 30. In turn, the image forming apparatus 30 acquires this attribute information list and displays the list at the operations panel 303. FIG. 7 is a diagram showing an exemplary display screen of the operations panel 303 displaying the attribute information list. It is noted that in the example of FIG. 7, the image forming apparatus 30 is functioning as a groupware terminal, and the operations panel 303 is displaying a groupware screen.

As is described above in relation to FIG. 3, since the attribute database 210 stores attribute information 211 of the manual document database 220, attribute information 212 of the drawing database 230, and attribute information 213 of the daily report database 240 according to the present embodiment, the operations panel 303 displays a button 313 for selecting the attribute information 211, a button 314 for selecting the attribute information 212, and a button 315 for selecting the attribute information 213.

The user may refer to the displayed attribute information list to select a button of the corresponding database to which the image forming apparatus 30 may desirably be connected so that the image forming apparatus 30 may be connected to the selected database (step S414).

When the desired database is selected by the user, the image forming apparatus 30 performs a process for determining whether the user is authorized to access the selected database. Specifically, the image forming apparatus 30 may transmit the user ID and password information authenticated in step S410 to the groupware server 20 via the communications unit 304. In turn, the control unit 251 of the groupware server 20 receives the user ID and password information and determines whether information matching the user ID and password information transmitted from the image forming apparatus 30 is included in the user information database 254.

If one set of information matching the user ID and password information transmitted from the image forming apparatus 30 is included in the user information database 254, the control unit 251 determines that the user is authorized to access the selected database of the groupware server 20 and allows the user to access the selected database.

In the present example, it is assumed that the manual document database 220 is selected as the database to be connected to the image forming apparatus 30. That is, the button 313 is selected by the user in the present example.

Figure 8:
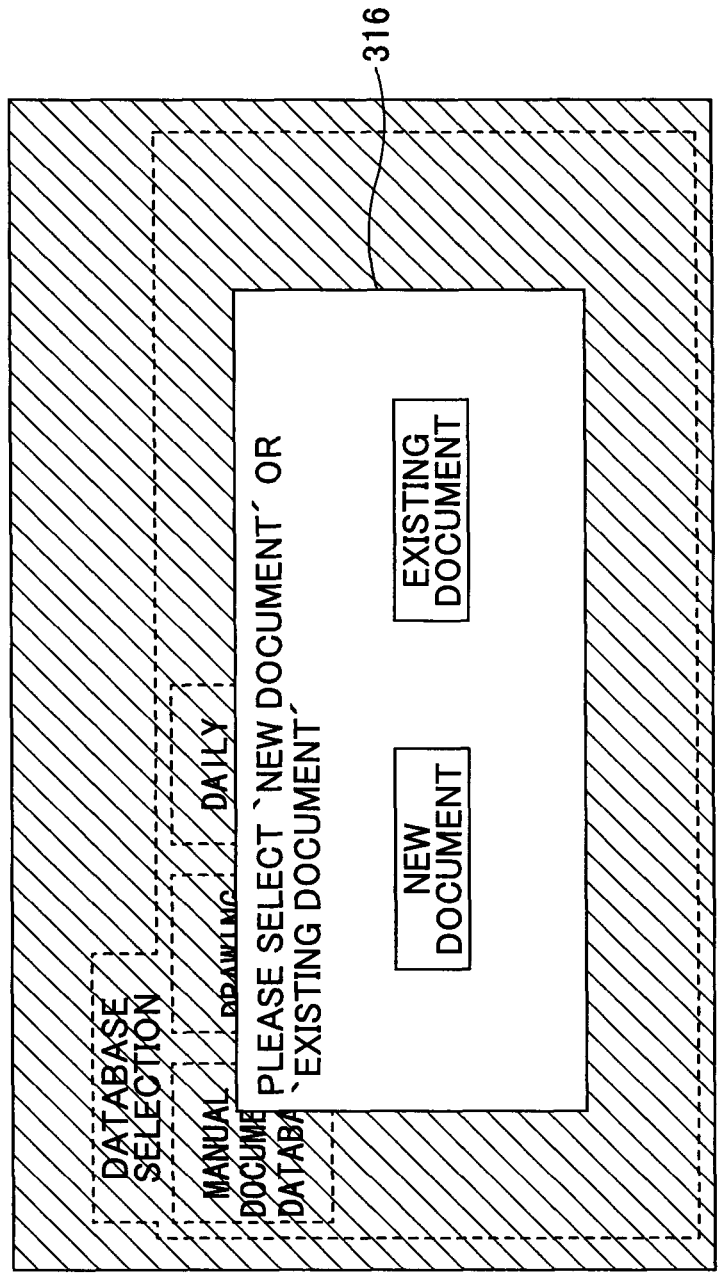
FIG. 8 is a diagram showing an exemplary display screen of the operations panel displaying a process selection screen.

When the database to which the image forming apparatus 30 is to be connected is selected in step S414, the image forming apparatus 30 prompts the user to select whether to perform a process of storing document data of a paper document to be scanned as a new groupware document data file in the database or a process of editing an existing groupware document data file stored in the database (step S415). FIG. 8 is a diagram showing an exemplary display screen of the operations panel 303 displaying a selection screen for selecting the process to be performed.

In the case where the process of storing document data of a paper document to be scanned as a new groupware document data file is selected, the image forming apparatus 30 starts the process of storing new document data in the manual document database 220.

Figure 9:
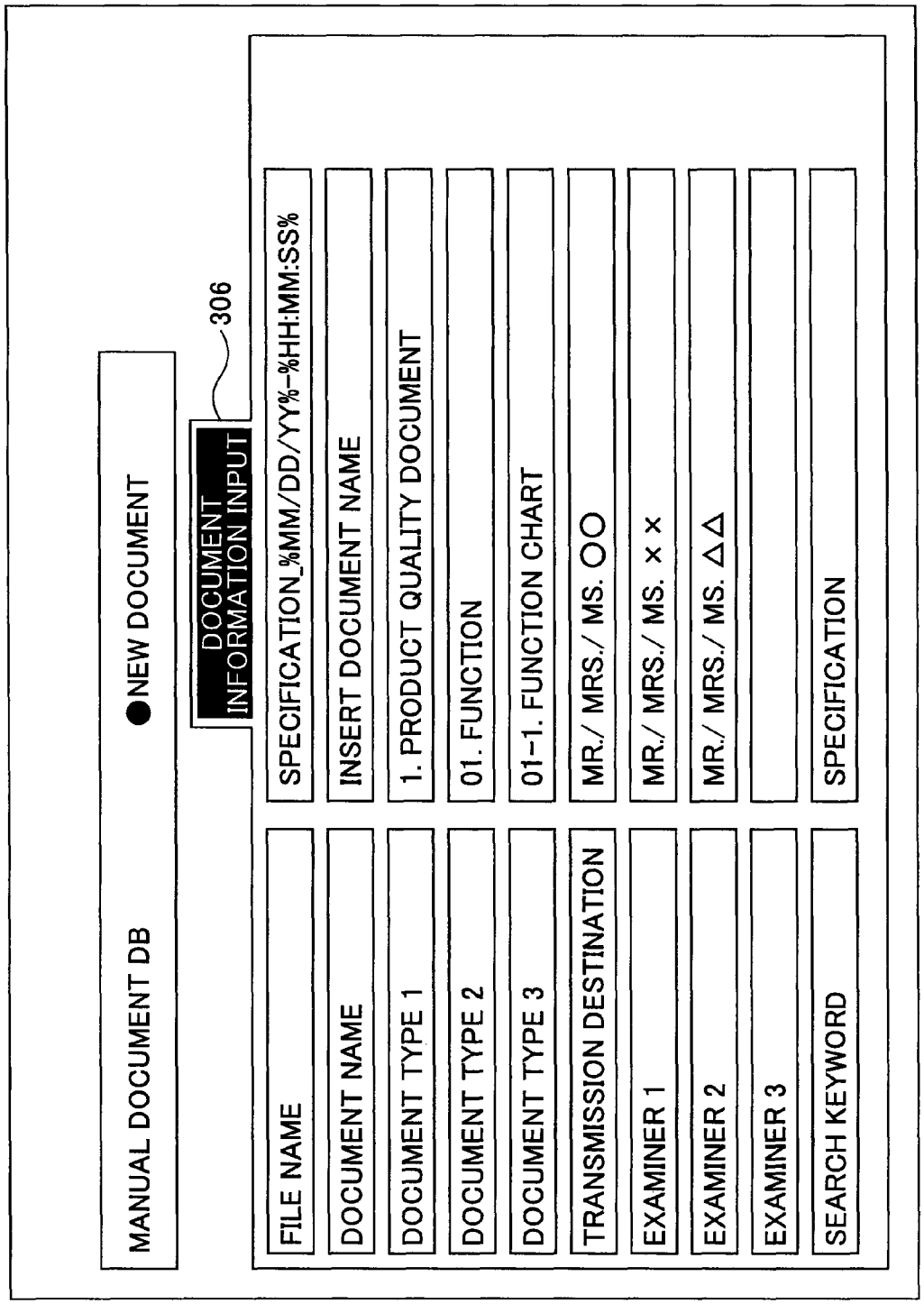
FIG. 9 is a diagram showing an exemplary display screen of the operations panel displaying a document information input screen.

The control unit 308 controls the operations panel 303 to display an input screen for setting document information included in the attribute information 211 of the manual document database 220. At this point, document information having corresponding initial values set thereto is displayed. FIG. 9 is a diagram showing an exemplary display screen of the operations panel 303 displaying an input screen for inputting document information. In the example shown in FIG. 9, the data document name of document data to be acquired through scanning, the file name with which the document data are to be stored in the manual document database 220, and search keys to be used for searching the document data may are input via the operations panel 303. By setting the document information, the attribute information 211 may be converted into attribute information 211A corresponding to the document data and is attached to the document data.

Next, the operations panel 303 moves on to displaying an action selection screen. It is noted that in the following descriptions, an action function refers to a function of executing a predetermined process on document data having corresponding attribute information attached thereto. The predetermined process to be executed by the action function may be set by the user beforehand, for example. In the example described below, operation means for issuing execution commands for executing such predetermined process is referred to as an action button.

Figure 10:
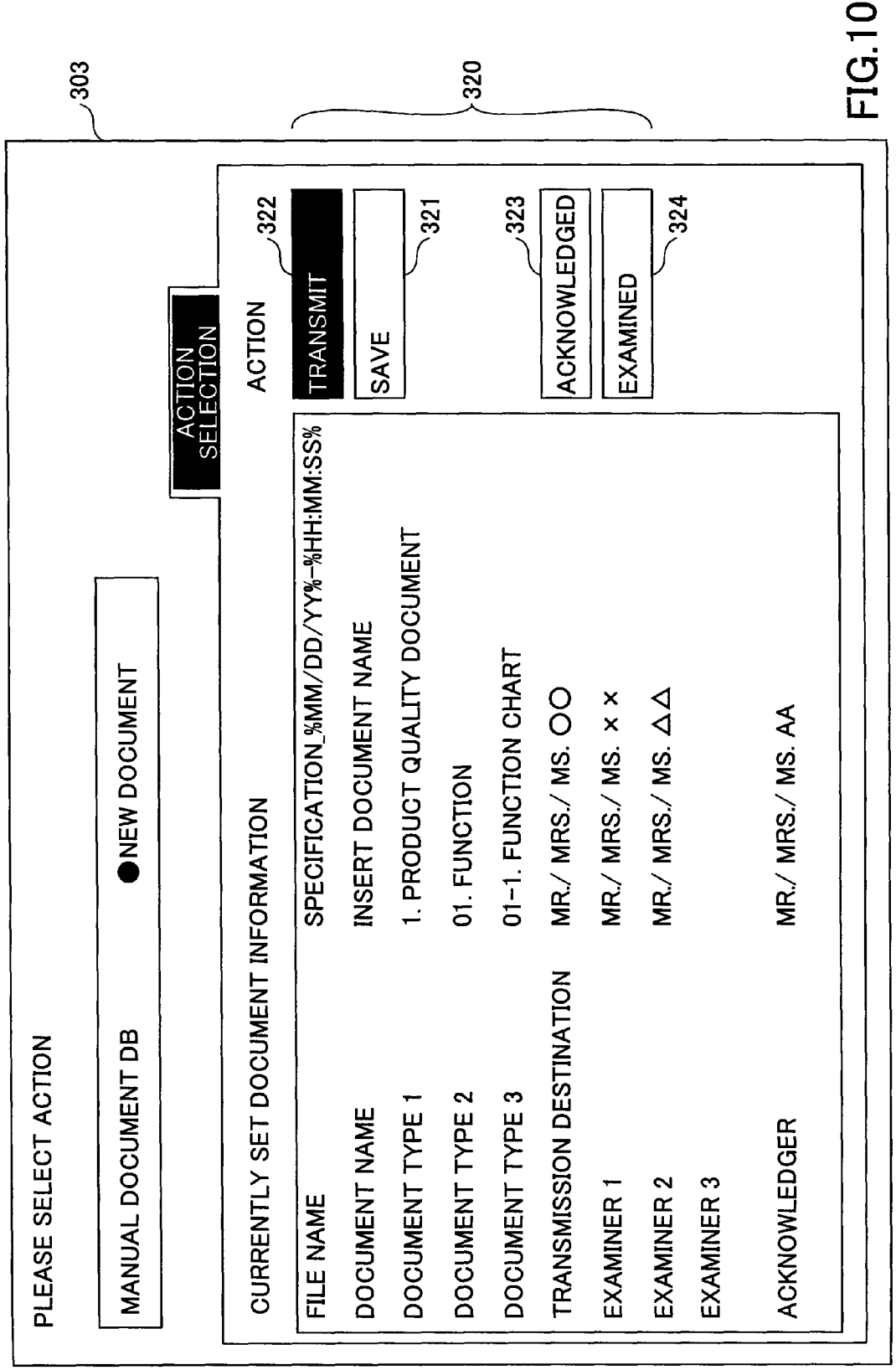
FIG. 10 is a diagram showing an exemplary display screen of the operations panel displaying an action selection screen.

FIG. 10 is a diagram showing an exemplary display screen of the operations panel 303 displaying an action selection screen. The operations panel 303 displays action buttons 320 and the document information set in step S417. In this way, the user may check the document information and press an action button to have the control unit 308 execute corresponding processes on the document data.

In the present example, an action button ('save') 321 for executing a storing process for storing the document data, an action button ('transmit') 322 for executing a transmission process for transmitting the document data, an action button ('acknowledged') 323 for executing an electronic sealing process for indicating acknowledgement of the document data, and an action button ('examined') 324 for executing an electronic sealing process for indicating that the document data have been examined are displayed. For example, if the user selects the action button 321 (step S418), the control unit 308 executes a process of storing the document data having attribute information 211A attached thereto in the manual document database 220.

Specifically, the control unit 308 transmits the document data having attribute information 211A to the groupware server 20 via the communications unit 304. The groupware server 20 receives the document data via the communications unit 252. Then, the write unit 253 executes a process of writing the document data along with the attribute information 211A in the manual document database 220 based on setting information of the manual document database 220 included in the attribute information 211A. In this way, the document data may be stored in the manual document database 220 along with the attribute information 211A.

It is noted that in the case where action buttons 320 are displayed on the operations panel 303 as in the illustrated example of FIG. 10, the text display describing the predetermined process (action) to be performed may be arbitrarily set by the user. For example, although the text display of the action button 321 is indicated as 'save' in FIG. 10, the text display may alternatively be indicated as 'store' or 'register', for example.

Also, in the case where the button 322 for executing a document data transmission process of is selected in step S418, the control unit 308 may execute a process of transmitting the document data having the attribute information 211A to a predetermined transmission destination address that is set in step S417. For example, if the transmission destination address of the document data corresponds to the address of an examiner of the document, the text display indicating the action of the action button 322 may be indicated as 'examination request' or some other suitable expression.

After the above-described setting operations for the document data to be acquired through scanning are completed, the user may set a corresponding paper document to the scan unit 302 of the image forming apparatus 30 to have the paper document scanned (step S419). After the document data of the paper document are acquired, the control unit 308 executes processes on the acquired document data based information set in the process steps S413 through S418. Specifically, the control unit 308 performs a process of attaching the attribute information 211A to the acquired document data and converting the document data into groupware document data. Then, the control unit 308 may directly store the groupware document data in the manual document database 220 from the image forming apparatus 30 (step S420).

As can be appreciated from the above descriptions, according to an embodiment of the present invention, the processes to be performed at a groupware client terminal may be performed via the operations panel 303 of the image forming apparatus 30. Also, document data acquired by the scanning function of the image forming apparatus 30 may be directly stored in a database within the groupware server 20 to which the image forming apparatus 30 is to be connected (connection destination database) as groupware document data. In this way, operations for converting a paper document into electronic document data may be simplified.

In a further embodiment of the present invention, the document information may be set by referring to format information unique to the connection destination database that is stored in the attribute database 210 so that the document information may be set in an appropriate format at the image forming apparatus 30. In this way, even when the connection destination database corresponds to an existing database, by registering setting information of this database in the attribute database 210, scanned document data acquired by the image forming apparatus 30 may have document information set thereto in the appropriate data format according to the format information included this setting information. Accordingly, document data set according to a format unique to a database may be directly stored from the image forming apparatus 30 without having to change the database design so that existing database resources may be readily used in the image forming system, for example.

Also, in one preferred embodiment, search keys to be used for searching document data may be set to document information included in the attribute information so that even when the document data are stored in the groupware server 20 as groupware document data, the document data may be easily searched and extracted using the search key set thereto.

In the following, the case in which the process of editing an existing groupware document data file stored in the database is selected in step S415 is described. In the following, an example is described in which attribute information of the groupware document data is changed and new document data are added to the existing groupware document data.

When an 'existing document' button displayed on the screen of FIG. 8 is selected in step S415, the image forming apparatus 30 acquires a list of existing groupware document files that is stored in the manual document database 220.

Specifically, the control unit 308 transmits a groupware document data file list acquisition request to the groupware server 20 via the communications unit 304. When this request is received at the groupware server 20, the control unit 251 acquires a groupware document data file 318 stored in the manual document database 220 and transmits the acquired list 318 to the image forming apparatus 30 via the communications unit 252.

Figure 11:
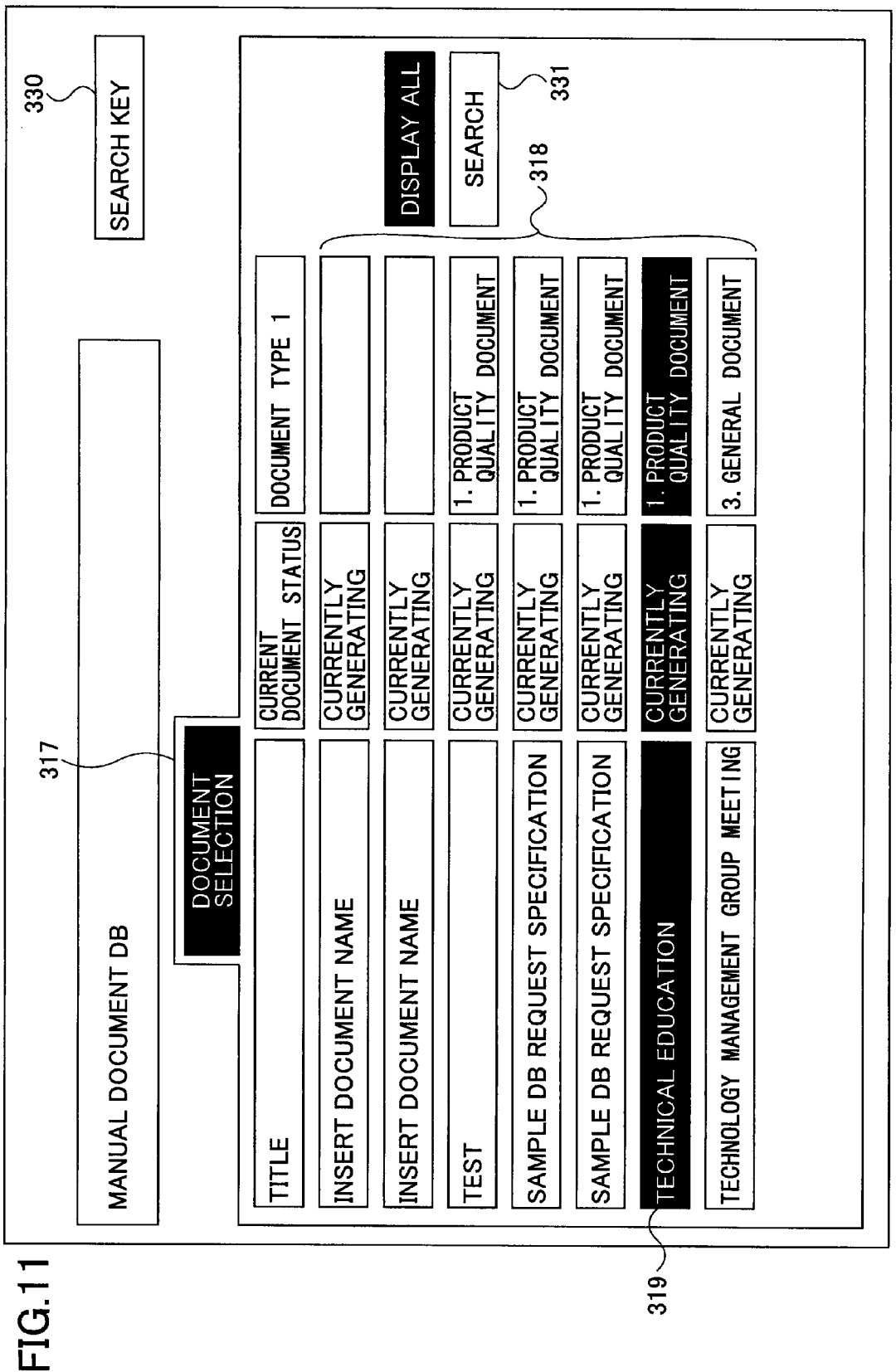
FIG. 11 is a diagram showing an exemplary display screen of the operations panel displaying a list of document data files.

Upon receiving the list 318, the control unit 308 displays the list 318 on the operations panel 303 to enable selection of a desired groupware document data file. FIG. 11 is a diagram showing an exemplary display screen of the operations panel 303 displaying the groupware document data list 318. From this list 318, the user may select the desired groupware document data file to which newly scanned document data are to be added (step S416). In the following, an example is described in which a groupware document data file 'Technical Education' 319 is selected.

According to one embodiment, in selecting a desired groupware document data file at the image forming apparatus 30, the desired groupware document data file may be searched from the list 318 displayed on the operations display panel 303. For example, the operations panel 303 may display a search key input area 330 for inputting a search key as is shown in FIG. 11. In this example, a search keyword may be input to the search key input area 330 and a search button 331 may be pressed by the user so that a command for executing a search process is issued to the image forming apparatus 30. Upon receiving the search command, the image forming apparatus 30 searches for the desired groupware document data file from the list 318 displayed on the operations panel 303. It is noted that the search key may include information such as a search keyword, a date, or file name of a document data file, for example.

Also, in one embodiment, the image forming apparatus 30 may control the number of groupware document data files displayed on the list 318. For example, if 1000 groupware document data files are stored in the manual document database 220, the image forming apparatus 30 may control the operations panel 303 to display only 500 of the groupware data files in the list 318. In this case, the search process using the search button 331 is performed on the 500 groupware document data files currently displayed on the list 318. By limiting the number of groupware document data files displayed on the list 318, the required time for the search process may be reduced.

When the desired groupware document data file is selected, the control unit 308 transmits an acquisition request to the groupware server to acquire document information having relevant information set thereto which document information is included in the attribute information of the selected groupware document data file. Specifically, in the present example, a request is made to acquire document information having relevant information set thereto that is included in the attribute information of the groupware document data file 'Technical Education' 319. Upon receiving this request, the control unit 251 acquires the requested document information. In the following, the process of acquiring such document information is described.

The attribute information of a groupware document data file includes identification information unique to this groupware document data file. Upon receiving the acquisition request, the control unit 251 accesses the attribute database 210 tracking the identification information included in the attribute information to reference the attribute information of the database selected in step S414 that is to be the connection destination of the image forming apparatus 30.

In the present example, the control unit 251 refers to the attribute information 211 of the manual document database 220. Then, the control unit 251 accesses the manual document database 220 based on the setting information of the manual document database 220 included in the attribute information 211. The control unit 251 acquires document information from the attribute information of the selected groupware document data file 'Technical Education' 319. Then, the control unit 251 transmits the acquired document information to the image forming apparatus 30 via the communications unit 252.

Upon acquiring the document information at the image forming apparatus 30, the control unit 308 controls the operations panel 303 to display the acquired document information. FIG. 12 is a diagram showing an exemplary display screen of the operations panel 303 displaying document information acquired by the image forming apparatus 30. The document information displayed in the illustrated example of FIG. 12 represent document information set at the time the 'Technical Education' file 319 has been stored in the manual document database 220 as new groupware document data. Specifically, the document information of the 'Technical Education' file 319 shown in the display screen of FIG. 12 corresponds to the document information having relevant information input thereto in the input screen shown in FIG. 9.

In step S417, the user may change the document information displayed as an input screen in FIG. 12. In the following, operations for changing the document information included in the attribute information are described.

The document information displayed by the operations panel 303 in the example of FIG. 12 may be changed using the software keyboard that is simultaneously displayed with the document information. For example, information set for one or more information items of the document information may be changed as is necessary or desired.

In the example of FIG. 12, information items that may be changed may include the file name, the document name, and the document type, for example. Specifically, the file name and/or the document name may be rewritten using the software keyboard displayed on the operations panel 303, for example. For the information items describing the document type, a pull-down input format may be employed to enable selection/input of a corresponding document type, for example. In this case, the user may select the corresponding document type using a pointer function of the operations panel 303.

In this way, the image forming apparatus 30 may change the document information included in the attribute information.

Figure 13:
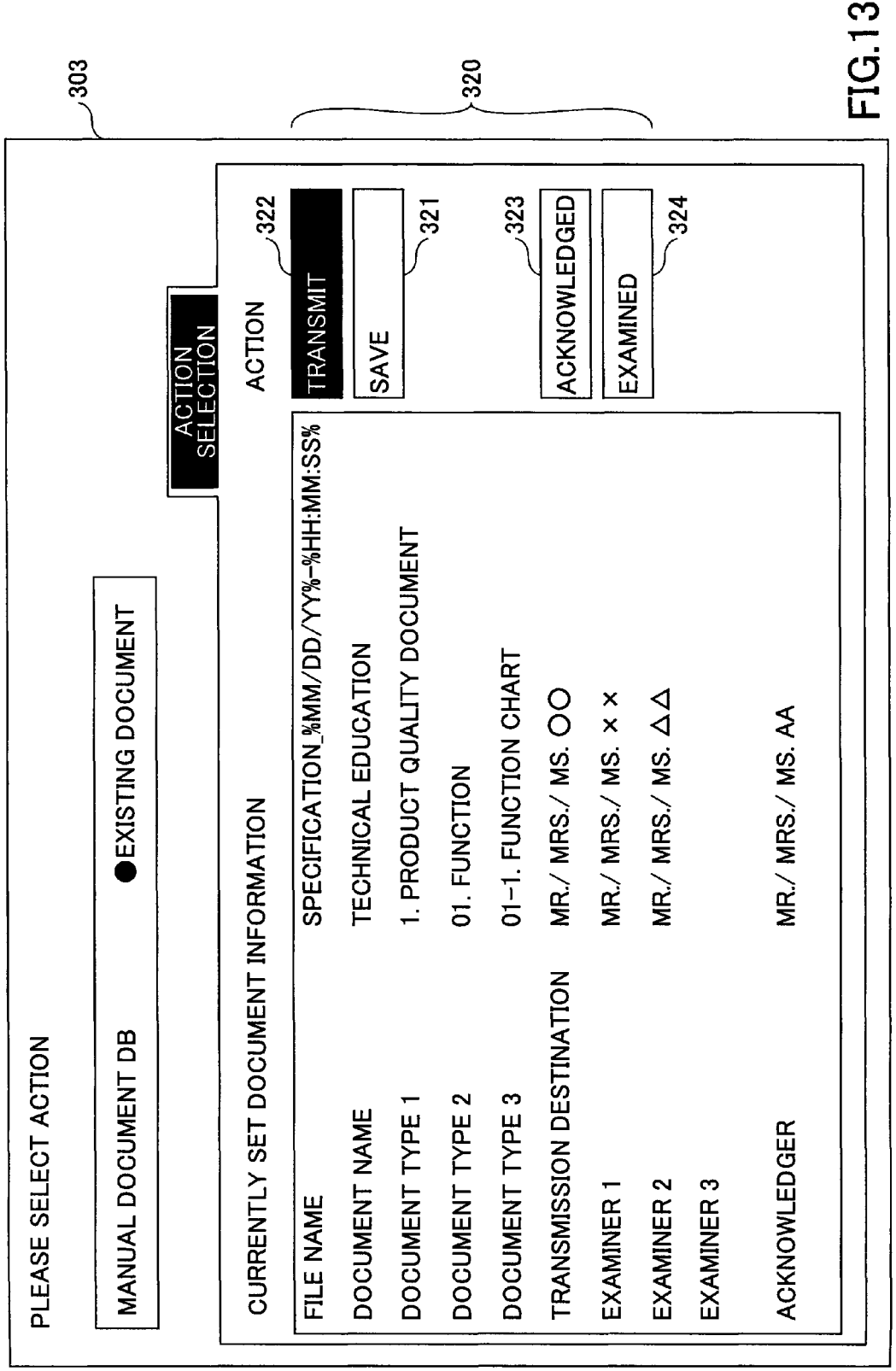
FIG. 13 is a diagram showing an exemplary display screen of the operations panel displaying actions that may be selectively performed on the document information.

In the following, the process of selecting an action in step S418 is described. FIG. 13 is a diagram showing an exemplary display screen of the operations panel 303 displaying an action selection screen.

In a case where the 'Technical Education' file 319 is read by Examiner 1 and examined at the image forming apparatus 30, the 'examined' action button 324 may be pressed by Examiner 1. In turn, the control unit 308 executes an electronic sealing process for indicating that the 'Technical Education' file 319 has been examined. After such a process is completed, the 'save' action button 321 may be pressed by Examiner 1. In turn, the control unit 308 transmits the 'Technical Education' file 319 to the groupware server 20 via the communications unit 304.

In a case where the 'Technical Education' file 319 is read and acknowledged by an acknowledger, the 'acknowledged' action button 323 is pressed by the acknowledger. In turn, the control unit 308 executes an electronic sealing process on the 'Technical Education' file 319 for indicating that the file has been acknowledged. After such process is completed, the 'save' action button 321 may be pressed by the acknowledger. In turn, the control unit 308 transmits the edited 'Technical Education' file 319 to the groupware server 20 via the communications unit 304.

Upon receiving the edited 'Technical Education' file 319, the control unit 251 of the groupware server 20 tracks the location at which the original 'Technical Education' file 319 is stored based on the identification information included in the attribute information of this 'Technical Education' file 319. Then, the write unit 253 stored the edited 'Technical Education' file 319 in the manual document database 220 by rewriting the edited 'Technical Education' file 319 onto the location at which the original 'Technical Education' file 319 is stored.

As can be appreciated from the above descriptions, according to an embodiment of the present invention, the status of groupware document data stored in the groupware server 20 may be directly changed and updated at the image forming apparatus 30.

In the following, the process of scanning a paper document in step S419 is described.

According to the present embodiment, a paper document to be scanned is set to the scan unit 302 of the image forming apparatus 30 by the user after setting and/or editing operations for the document data to be acquired (scanned) by the scan unit 302 are completed.

After the paper document is scanned by the scan unit 302, the control unit 308 adds the newly scanned/acquired document data to the 'Technical Education' file 319. The 'Technical Education' file 319 turns into 'Technical Education' file 319A upon having the new document data added thereto and having changed attribute information attached thereto. The 'Technical Education' file 319A is then rewritten on the manual document database 220 as groupware document data. It is noted that in the above-described rewriting process, the control unit 251 tracks the identification information included in the changed attribute information to determine the location at which the edited groupware document data file is to be rewritten. In one embodiment, the image forming apparatus 30 may print and output the edited groupware document data file before it is stored in the database.

It is noted that in the above-described embodiments, it is assumed that the groupware document data read by the image forming apparatus 30 contain document data and attribute information. However, the present invention is not limited to such an arrangement, and in other embodiments, attribute information may be pre-set at the image forming apparatus 30, and arrangements may be such that only such pre-set attribute information may be stored in a document database of the groupware server 20, for example. In this case, the attribute information stored in the database may be subsequently read to add document data in an editing process, for example.

As can be appreciated from the above descriptions, according to an embodiment of the present invention, the image forming apparatus 30 may be capable of executing editing processes including changing attribute information of an existing groupware document data file stored in the groupware server 20 and/or adding new document data to the existing groupware document data file.

Also, according to one preferred embodiment, the image forming apparatus 30 may record log information of the processes executed at the image forming apparatus 30. For example, the log information may be gathered by the control unit 308 and stored in a storage unit (not shown) of the image forming apparatus 30. It is noted that in the present descriptions, log information may include information such as the name of the database accessed as the connection destination database, the file name of the document data file subject to the process, the document name, the type of process executed by the image forming apparatus 30, the name of the database to which the document data are stored, and the processing result, for example. In one embodiment, the log information may be accumulated at the image forming apparatus 30 up to a predetermined capacity and the accumulated log information may be transferred to the groupware server 20 after reaching the predetermined capacity.

Also, in one embodiment, the above-described functions and processes of the image forming system may be realized by a computer-readable image forming program that is stored in a computer-readable medium.

Figure 14:
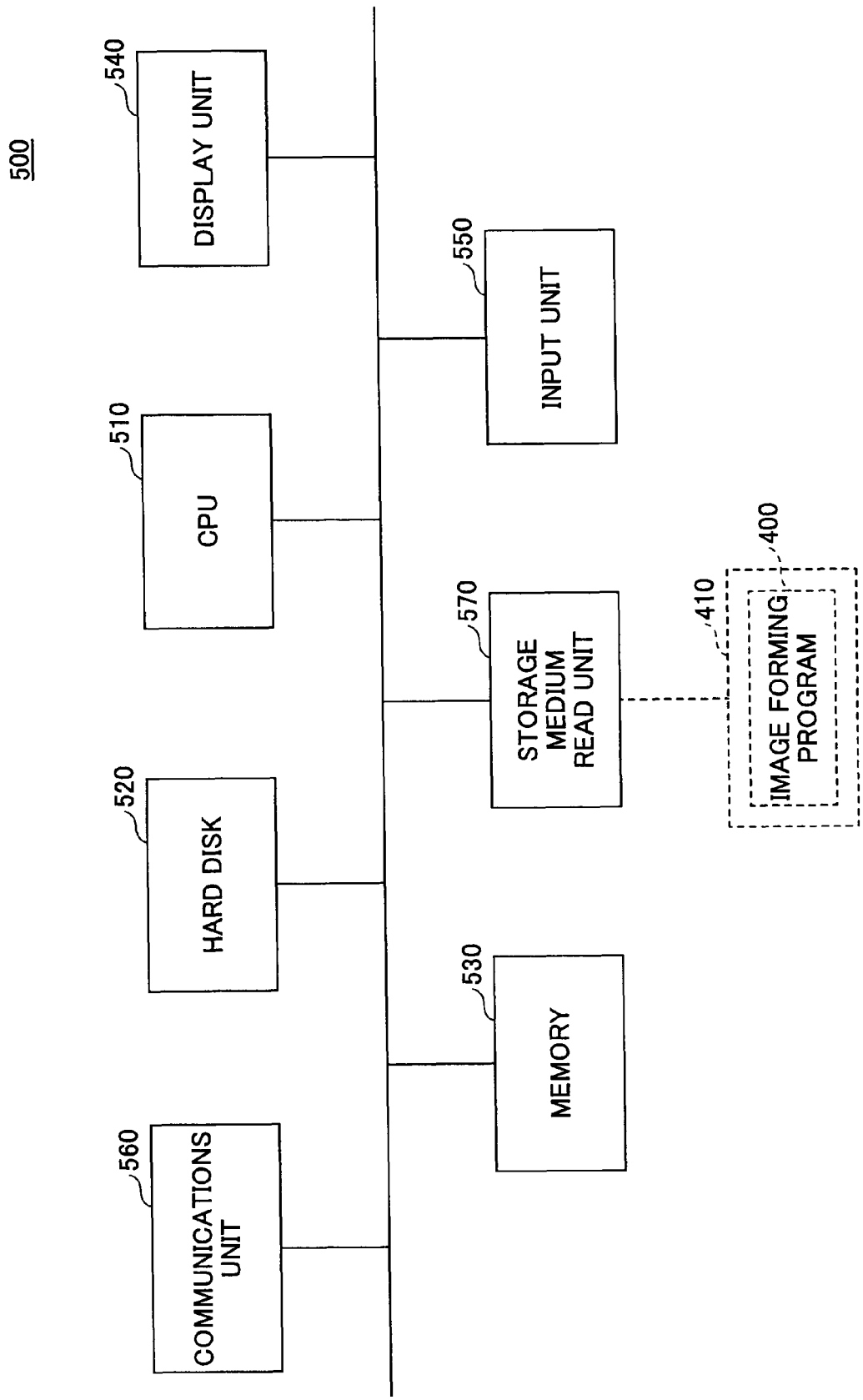
FIG. 14 is a block diagram showing an exemplary configuration of a computer that is configured to read and execute an image forming program according to an embodiment of the present invention.

FIG. 14 is a block diagram showing an exemplary configuration of a computer 500 that is configured to read and execute a computer-readable image forming program according to an embodiment of the present invention that is stored in a computer-readable storage medium 410.

According to the present example, the computer 500 includes a CPU 510, a hard disk 520, a memory 530, a display unit 540, an input unit 550, a communications unit 560, and a storage medium read unit 570. The CPU 510 may be a computation processing device that controls execution of computations and processes within the computer 500. The hard disk 520 is for storing data including applications that are run on the computer 500 and data generated by such applications, for example. The memory 530 may be for storing information including various setting values for the computer 500 and computation results of the CPU 510, for example.

The display unit 540 may be a display device for enabling the user to view data generated at the computer 500, for example. The input unit 550 may be a keyboard or a mouse that is used by the user to input various types of data, for example. The communications unit 560 may be a network control unit that is used to establish communication between the computer 500 and an external apparatus, for example. The storage medium read unit 570 may be a floppy (registered trademark) disk driver or some other type of drive unit that is capable of reading data and programs stored in a storage medium.

The storage medium 410 stores an image forming program 400 for executing image forming functions according to an embodiment of the present invention. In the present example, the image forming program 400 is read by the storage medium read unit 570 and is executed by the CPU 510. The storage medium 410 may be a floppy (registered trademark) disk, a CD-ROM (Compact Disk Read Only Memory), or some other type of computer-readable medium that may be read by the computer 500. Also, in another embodiment, the image forming program 400 may be received at the communications unit 560 via a network to be stored in the hard disk 520, for example.

Although the present invention is shown and described with respect to certain preferred embodiments, it is obvious that equivalents and modifications may occur to others skilled in the art upon reading and understanding the specification. The present invention includes all such equivalents and modifications, and is limited only by the scope of the claims.

The present application is based on and claims the benefit of the earlier filing date of Japanese Patent Application No. 2006-284315 filed on Oct. 18, 2006, the entire contents of which are hereby incorporated by reference.

What is claimed is:

1. An image forming system, comprising:
a groupware server; and
an image forming apparatus that functions as a groupware terminal, wherein
the groupware server includes a plurality of document databases, each storing document data and attribute information corresponding to the document data, and an attribute database that stores pre-registered database attribute information corresponding to each of the document databases;
the image forming apparatus accesses the attribute database to acquire and display, on an operations panel of the image forming apparatus, a list of the document databases;
the image forming apparatus includes a selection unit that accepts selection of one of the displayed document databases as a selected document database;
the image forming apparatus acquires design information related to the selected document database that is included in the pre-registered database attribute information of the selected document database and controls the operations panel of the image forming apparatus to display information items according to format information included in the design information, the format information being unique for each document database, wherein the pre-registered database attribute information for each document database includes information indicating which information items are to be displayed for the corresponding document database;
the image forming apparatus includes a read unit that reads the document data and the corresponding attribute information corresponding to the document data stored in the selected document database, and a change unit that changes the corresponding attribute information read by the read unit into changed attribute information; and
the groupware server stores the read document data and the changed attribute information in the selected document database.

2. The image forming system as claimed in claim 1, wherein
the image forming apparatus includes a scan unit that scans a paper document and acquires scanned document data of the paper document;
the image forming apparatus generates changed document data by adding the scanned document data acquired by the scan unit to the document data read by the read unit; and
the groupware server stores the changed document data in the selected document database.

3. The image forming system as claimed in claim 1, wherein
the image forming apparatus includes a scan unit that scans a paper document and acquires scanned document data of the paper document;
the image forming apparatus generates changed document data by adding the scanned document data acquired by the scan unit to the document data read by the read unit; and
the groupware server stores the changed document data in the selected document database.

4. The image forming system as claimed in claim 1, wherein
the image forming apparatus acquires and displays all or a portion of a document data list that is stored in the selected document database; and
the image forming apparatus includes a search unit that searches the document data to be read by the read unit from the displayed document data list based on a search key.

5. The image forming system as claimed in claim 1, wherein
the attribute information includes at least groupware environment information, setting information of the selected document database in which the document data are stored, and document information pertaining to the document data.

6. The image forming system of claim 1, wherein the format information includes at least one of a format of a file name, a format of a creation time of the document data, and a format of a creator name of the document data.

7. The image forming system of claim 1, wherein the format information includes initial setting values of the information items, data types of the information items, and display data formats of the information items.

8. A groupware server that is connected to an image forming apparatus that functions as a groupware terminal, the groupware server comprising:
a communications unit that establishes communication with the image forming apparatus;
a plurality of document databases, each storing document data and attribute information corresponding to the document data;
an attribute database that stores pre-registered database attribute information corresponding to each of the document databases; and
a write unit that writes the document data and the attribute information corresponding to the document data to each document database, wherein the image forming apparatus accesses the attribute database to acquire and display, on an operations panel of the image forming apparatus, a list of the document databases;

the image forming apparatus includes a selection unit that accepts selection of one of the displayed document databases as a selected document database;

when the communications unit receives an acquisition request for the attribute information corresponding to the document data from the image forming apparatus, the communications unit transmits the attribute information corresponding to the document data to the image forming apparatus, and the image forming apparatus controls the operation panel to display information items according to format information unique to the pre-registered database attribute information of the selected document database by acquiring design information related to the selected document database included in the pre-registered database attribute information of the selected document database, the design information including the format information, which is unique for each document database, wherein the pre-registered database attribute information for each document database includes information indicating which information items are to be displayed for the corresponding document database; and when the communications unit receives a write request from the image forming apparatus to write changed attribute information that is changed from the attribute information corresponding to the document data, the write unit rewrites the changed attribute information on the selected document database.

9. The groupware server as claimed in claim 8, wherein when the communications unit receives a write request from the image forming apparatus to write changed document data having new document data added to the document data, the write unit rewrites the changed document data on the selected document database.

10. An image forming method to be performed by an image forming apparatus that functions as a groupware terminal and is connected to a groupware server including a plurality of document databases, each storing document data and attribute information corresponding to the document data, and an attribute database that stores pre-registered database attribute information corresponding to each of the document databases, the image forming method comprising:

reading the document data and the attribute information corresponding to the document data from the groupware server;

accessing the attribute database to acquire and display, on an operations panel of the image forming apparatus, a list of the document databases;

changing the read attribute information into changed attribute information;

accepting selection of one of the displayed document databases as a selected document database;

controlling the operations panel of the image forming apparatus to display information items according to format information unique to the pre-registered database attribute information of the selected document database by acquiring design information related to the selected document database that is included in the pre-registered database attribute information of the selected document database, the design information including the format information, which is unique for each document database, wherein the pre-registered database attribute information for each document database includes information indicating which information items are to be displayed for the corresponding document database; and transmitting the read document data and the changed attribute information to the groupware server.

* * * * *